United States Patent
Thompson et al.

(10) Patent No.: US 11,702,005 B2
(45) Date of Patent: Jul. 18, 2023

(54) ADAPTIVE VEHICLE HORN

(71) Applicant: Toyota Motor Engineering & Manufacturing North America, Inc., Plano, TX (US)

(72) Inventors: Derek A. Thompson, Ypsilanti, MI (US); Krishna V. Buddharaju, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 245 days.

(21) Appl. No.: 16/879,869

(22) Filed: May 21, 2020

(65) Prior Publication Data
US 2021/0362649 A1 Nov. 25, 2021

(51) Int. Cl.
*B60Q 5/00* (2006.01)
*G01S 13/931* (2020.01)

(52) U.S. Cl.
CPC ............. *B60Q 5/005* (2013.01); *B60Q 5/001* (2013.01); *G01S 13/931* (2013.01); *G01S 2013/9323* (2020.01)

(58) Field of Classification Search
CPC ....... B60Q 5/005; B60Q 5/001; G01S 13/931; G01S 2013/9323
See application file for complete search history.

(56) References Cited

U.S. PATENT DOCUMENTS

| | | | |
|---|---|---|---|
| 8,169,305 B2 | 5/2012 | Matsumoto et al. | |
| 9,452,711 B2 | 9/2016 | Lee | |
| 9,475,461 B1 | 10/2016 | Pudiyathanda et al. | |
| 10,354,265 B2 * | 7/2019 | Patsiokas | G06Q 30/0261 |
| 2008/0140318 A1 * | 6/2008 | Breed | G05D 1/0274 702/3 |
| 2016/0293008 A1 * | 10/2016 | Nagata | H04W 4/02 |
| 2017/0190331 A1 * | 7/2017 | Gupta | G05D 1/0088 |

\* cited by examiner

*Primary Examiner* — Ig T An
(74) *Attorney, Agent, or Firm* — Christopher G. Darrow; Darrow Mustafa PC

(57) ABSTRACT

A system that includes a vehicle horn can reduce noise pollution caused by vehicles. The system can include a vehicle horn that has a signal-based mode and a sound-based mode. In the signal-based mode, the vehicle horn can output an electronic signal. In the sound-based mode, the vehicle horn can output an audible signal. The system can select one of the signal-based mode and the sound-based mode for the vehicle horn based on the driving environment data acquired by one or more sensors. Upon receiving a horn command, the system can cause the vehicle horn to output a signal based on the selected mode.

6 Claims, 3 Drawing Sheets

ADAPTIVE VEHICLE HORN

FIELD

The subject matter described herein relates in general to vehicles and, more particularly, to vehicle horns.

BACKGROUND

Vehicles include devices for communicating with entities in the external environment. For example, a vehicle can include turn signals, brake lights, reverse lights, and horns. A vehicle horn makes an audible "honk" or a "beep" sound. A vehicle driver can use the horn to alert others of the vehicle's presence or to draw attention.

SUMMARY

In one respect, the subject matter presented herein is directed to a system that includes a vehicle horn. The vehicle horn can have a signal-based mode and a sound-based mode. In the signal-based mode, the vehicle horn outputs an electronic signal. In the sound-based mode, the vehicle horn outputs an audible signal. The system can include one or more sensors. The one or more sensors can be configured to acquire driving environment data of at least a portion of the external environment of an ego vehicle. The system can include one or more processors. The one or more processors can be operatively connected to the vehicle horn. The system can include one or more data stores communicably coupled to the one or more processors. The one or more data stores can store instructions that when executed by the one or more processors cause the one or more processors to select one of the signal-based mode and the sound-based mode for the vehicle horn based on the driving environment data acquired by the one or more sensors. The one or more data stores can further store instructions that when executed by the one or more processors cause the one or more processors to receive a horn command, and responsive to receiving the horn command, cause the vehicle horn to output a signal based on the selected mode.

DETAILED DESCRIPTION

Figure 1:
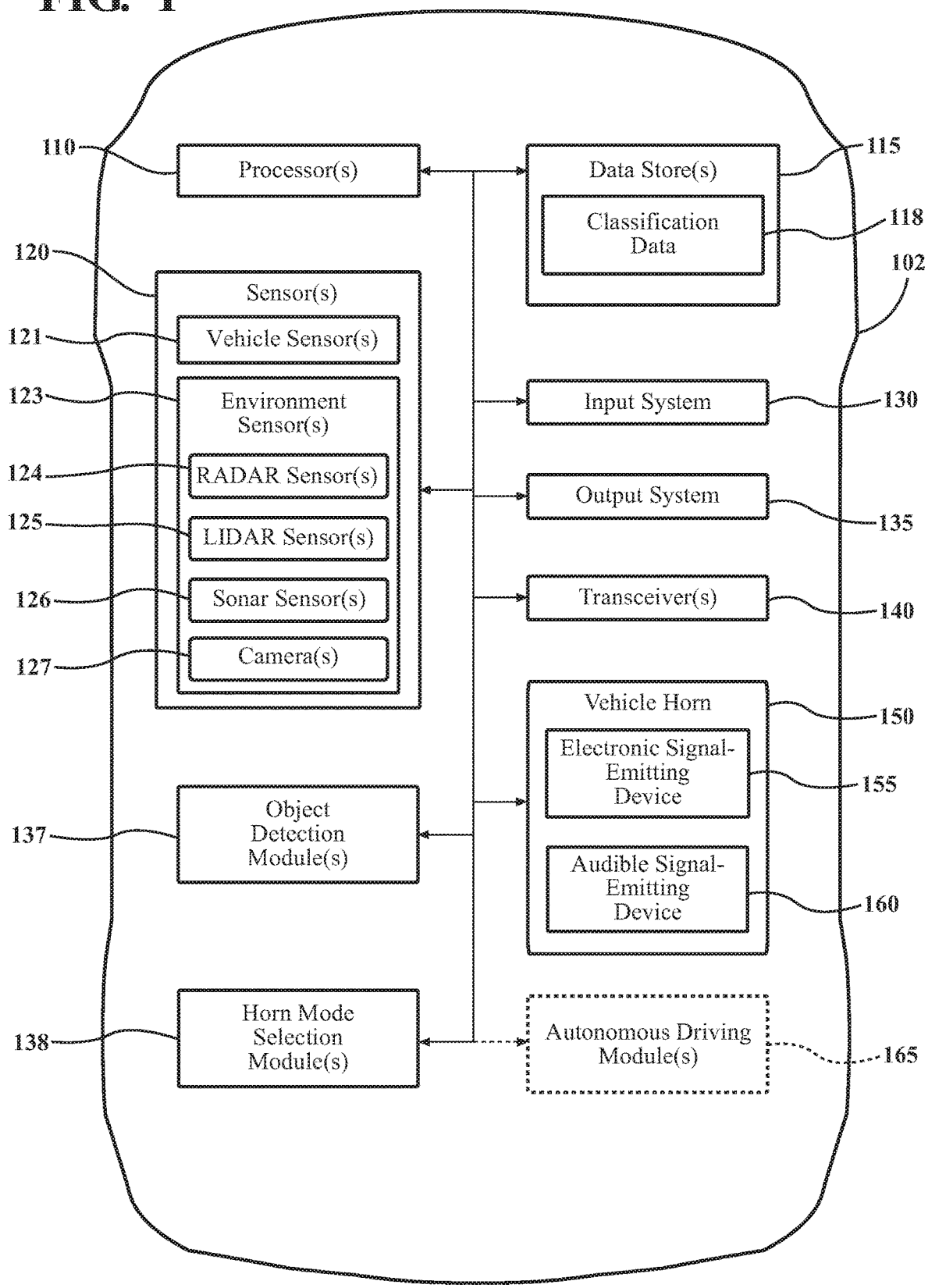
FIG. 1 is an example of an ego vehicle.

Vehicle horns outputting audible sounds in an external environment can increase noise pollution levels. According to arrangements herein, a vehicle horn can be configured to provide an adaptive horn output. An adaptive vehicle horn can be configured to emit an audible horn sound or an electronic horn signal. The adaptive vehicle horn can cause the output of the horn to vary based on real-time driving environment conditions. The adaptive horn can reduce noise pollution by limiting the use of the audible horn sound by outputting the electronic horn signal in certain conditions.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of an ego vehicle 102 is shown. As used herein, "vehicle" means any form of motorized transport. In one or more implementations, the ego vehicle 102 can be an automobile. While arrangements will be described herein with respect to automobiles, it will be understood that embodiments are not limited to automobiles. In some implementations, the ego vehicle 102 may be a watercraft, an aircraft, or any other form of motorized transport.

The ego vehicle 102 can be a connected vehicle. A connected vehicle can be a vehicle that is communicatively linked to other connected vehicles. As such, a non-connected vehicle can be a vehicle that is not communicatively linked to connected vehicles. As used herein, the term "communicatively linked" can include direct or indirect connections through a communication channel or pathway or another component or system. The one or more of the elements of the connected vehicle may include and/or execute suitable communication software, which enables various elements to communicate with each other through the communication network and perform the functions disclosed herein.

The connected vehicles can be communicatively linked in any suitable manner. For instance, the connected vehicles can be communicatively linked by one or more communication networks. A "communication network" means one or more components designed to transmit and/or receive information from one source to another. The one or more communication networks, which can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short-range (e.g., vehicle-to-vehicle (V2V) wireless communication, a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long-range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The ego vehicle 102 can have a manual operational mode in which all of or a majority of the navigation and/or maneuvering of the ego vehicle 102 is performed by a human driver. In one or more arrangements, the ego vehicle 102 can be a conventional vehicle that is configured to operate in only a manual mode.

In one or more arrangements, the ego vehicle 102 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with minimal or no input from a human driver. In one or more arrangements, the ego vehicle 102 can be highly automated or completely automated.

The ego vehicle 102 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. Examples of a semi-autonomous operational mode is when an adaptive cruise control and/or lane keeping is activated.

The ego vehicle 102 can be configured to be switched between the various operational modes, including between any of the above-described operational modes.

The ego vehicle 102 can include various elements. Some of the possible elements of the ego vehicle 102 are shown in FIG. 1 and will now be described. It will be understood that it is not necessary for the ego vehicle 102 to have all of the elements shown in FIG. 1 or described herein. The ego vehicle 102 can have any combination of the various elements shown in FIG. 1. Further, the ego vehicle 102 can have additional elements to those shown in FIG. 1. In some arrangements, the ego vehicle 102 may not include one or more of the elements shown in FIG. 1. Further, while the various elements are shown as being located within the ego vehicle 102 in FIG. 1, it will be understood that one or more of these elements can be located external to the ego vehicle 102. One or more of these elements can be included in one of the ego vehicle 102 and the ego vehicle 102 or in both the ego vehicle 102 and the ego vehicle 102. Further, the elements shown may be physically separated by large distances.

The ego vehicle 102 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the ego vehicle 102. For instance, the processor(s) 110 can be an electronic control unit (ECU).

The ego vehicle 102 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

As noted above, the ego vehicle 102 can include one or more sensors 120. "Sensor" means any device, component and/or system that can detect, determine, assess, monitor, measure, quantify and/or sense something. The one or more sensors 120 can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process. Data acquired by the one or more sensors 120 can be stored in the data store(s) 115.

In arrangements in which there is a plurality of sensors, the sensors can work independently from each other. Alternatively, two or more of the sensors can work in combination with each other. In such case, the two or more sensors can form a sensor network. The one or more sensors can be operatively connected to the processor(s) 110, the data store(s) 115, and/or other element of the ego vehicle 102 (including any of the elements shown in FIG. 1).

The sensor(s) 120 can be any suitable type of sensor. Various examples of different types of sensors will be described herein. However, it will be understood that the embodiments are not limited to the particular sensors described.

The sensor(s) 120 can include one or more vehicle sensors 121. The vehicle sensor(s) 121 can detect, determine, assess, monitor, measure, quantify and/or sense information about the ego vehicle 102 itself (e.g., position, orientation, speed, etc.).

The sensor(s) 120 can include one or more environment sensors 123 configured to acquire, and/or sense driving environment data. "Driving environment data" includes data or information about the external environment in which the ego vehicle is located or one or more portions thereof. For example, the one or more environment sensors 123 can be configured to detect, quantify and/or sense objects in at least a portion of the external environment of the ego vehicle 102 and/or information/data about such objects. In one or more arrangements, the environment sensors 123 can include one or more radar sensors 124, one or more LIDAR sensors 125, one or more sonar sensors 126, and/or one or more cameras 127. In one or more arrangements, the one or more cameras 127 can be high dynamic range (HDR) cameras or infrared (IR) cameras.

The ego vehicle 102 can include an input system 130. An "input system" includes any device, component, system, element or arrangement or groups thereof that enable information/data to be entered into a machine. The input system 130 can receive an input from a vehicle occupant (e.g., a driver or a passenger). Any suitable input system can be used, including, for example, a keypad, display, touch screen, multi-touch screen, button, joystick, mouse, trackball, microphone and/or combinations thereof.

The ego vehicle 102 can include an output system 135. An "output system" includes any device, component, system, element or arrangement or groups thereof that enable information/data to be presented to a vehicle occupant (e.g., a person, a vehicle occupant, etc.). The output system 135 can present information/data to a vehicle occupant. The output system 135 can include a display. Alternatively, or in addition, the output system 135 may include an earphone and/or speaker. Some components of the ego vehicle 102 may serve as both a component of the input system 130 and a component of the output system 135.

The ego vehicle 102 can include one or more transceivers 140. As used herein, "transceiver" is defined as a component or a group of components that transmit signals, receive signals, or transmit and receive signals, whether wirelessly or through a hard-wired connection. The transceiver(s) 140 can enable communications between the ego vehicle 102 and other vehicles (e.g., connected vehicle) in the driving environment. The transceiver(s) 140 can be any suitable transceivers used to access a network, access point, node or other device for the transmission and receipt of data. The transceiver(s) 140 may be wireless transceivers using any one of a number of wireless technologies, now known or in the future.

In arrangements in which the ego vehicle 102 is an autonomous vehicle or has one or more autonomous operational modes, the ego vehicle 102 can include one or more autonomous driving modules 165. The autonomous driving module(s) 165 can be configured to receive data from the sensor(s) 120. In one or more arrangements, the autonomous driving module(s) 165 can use such data to determine travel path(s), current autonomous driving maneuvers for the ego vehicle 102, future autonomous driving maneuvers and/or modifications to current autonomous driving maneuvers, driving scene models, and/or data from any other suitable source such as determinations from the sensor data. Examples of driving maneuvers include: accelerating, decelerating, braking, stopping, turning, moving in a lateral direction of the vehicle, changing travel lanes, merging into a travel lane, and/or reversing, just to name a few possibilities. The autonomous driving module(s) 165 can be configured to cause, directly or indirectly, autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 165 can be configured to execute various vehicle functions and/or to transmit data to, receive data from, interact with, and/or control the ego vehicle 102 or one or more systems thereof.

The ego vehicle 102 can include the vehicle horn 150. The vehicle horn 150 can output a signal in response to a horn command. The input system 130 can be configured to receive the horn command. The horn command indicates a request for a vehicle horn 150 to output a signal. The horn command can be based on user input. In other words, the horn command can be from a user (such as a driver or a passenger) in the ego vehicle 102. As an example, using the input system 130, the user may input the horn command by depressing a button, which may be a part of the input system 130. Alternatively and additionally, the horn command can be based on an automated input. For example, the automated input can be a control signal from an autonomous or semi-autonomous driving module 165.

The vehicle horn 150 can include an electronic signal-emitting device 155 and an audible signal-emitting device 160. The vehicle horn 150 can have a signal-based mode and a sound-based mode. The vehicle horn 150, in the signal based mode, can activate the electronic signal-emitting device 155 to output an electronic signal to one or more connected vehicles in response to the horn command. In some instances, the electronic signal can include location information (e.g., geographical coordinates) of the ego vehicle 102. The electronic signal-emitting device 155 can transmit the electronic signal to the connected vehicles using any suitable communication method, now known or later developed. In one or more arrangements, the electronic signal can be transmitted via the transceiver 140.

The vehicle horn 150, in the sound-based mode, can activate the audible signal-emitting device 160 to output an audible signal to the external environment of the ego vehicle 102. Thus, the audible signal-emitting device 160 can output a sound audible to humans and animals in the external environment of the ego vehicle 102.

The ego vehicle 102 can include one or more modules, which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

In one or more arrangements, the ego vehicle 102 can include one or more object detection modules 137. The object detection module(s) 137 can be configured to detect the presence of one or more objects in the driving environment of the ego vehicle 102, including humans, animals, and other vehicles. The detection of an object can be performed in any suitable manner. For instance, the detection can be performed using data acquired by one or more sensors 120. Any suitable object detection technique, now known or later developed, can be used.

If one or more objects are detected, the object detection module(s) 137 and/or other module(s) can, in one or more arrangements, attempt to classify the type, nature, and/or identity of the detected object(s). In some arrangements, the object detection module(s) 137 can be configured to classify whether the detected object(s) is an object of interest. The object of interest can be a predetermined set of one or more object types. For instance, the object of interest can be one of a person, an animal, and a vehicle. If the detected object is not a person, an animal, or a vehicle, then the object detection module(s) 137 can classify the detected object as unknown, unclassified, other, or otherwise not an object of interest.

The object detection module(s) 137 can attempt to classify the detected object in any suitable manner. For instance, in one or more arrangements, the object detection module(s) 137 can include and/or have access to an object image database, which can be stored in the data store(s) 115 or in one or more remote data stores. The object image database can include one or more images of a plurality of different objects, including people, animals, and/or vehicles. The images may be of one or more portions of the exterior of at least a portion of a plurality of different objects. For instance, the images can be of at least a portion of an object.

The object detection module(s) 137 can analyze sensor data captured by the sensor(s) 120 to classify objects detected therein. The object detection module(s) 137 can use any suitable technique, including, for example, template matching and other kinds of computer vision and/or image processing techniques and/or other artificial or computational intelligence algorithms or machine learning methods. The object detection module(s) 137 can include any suitable object recognition software. The object detection module(s) 137 can query the object image database for possible matches. For instance, images captured by the camera(s) 127 can be compared to images in the object image database for possible matches. Alternatively or in addition, measurements or other aspects of an image captured by the camera(s) 127 can be compared to measurements or other aspects of any images in the object image database. The object detection module(s) 137 can classify the detected object as a particular type of object if there is a match between the captured image and an image in the object database. "Match" or "matches" means that an image or other information collected by the sensor(s) and one or more of the images in the object image database are substantially identical. For instance, an image or other information collected by the sensor(s) and one or more of the images in the object image database can match within a predetermined probability (e.g., at least about 85%, at least about 90%, at least about 95% or greater) or confidence level. In one or more arrangements, the detected object can be compared to identifying features of an object, such as color measured visually, shape, size, movement, sounds, etc.

Upon classifying a detected object as a vehicle, the ego vehicle 102 and/or the object detection module(s) 137 can further determine whether the detected vehicle is a connected vehicle or a non-connected vehicle. As an example, the ego vehicle 102 and/or the object detection module(s) 137 can broadcast a signal to surrounding vehicles and listen for which of the surrounding vehicles respond to the broadcast signal. The object detection module(s) 137 can classify the surrounding vehicles that responded as connected vehicles and the surrounding vehicles that did not respond as non-connected vehicles. Alternatively or additionally, the ego vehicle 102 may receive an initial signal from one or more surrounding vehicles, that is, a signal that is not in response to a signal from the ego vehicle 102. In such case, the object detection module(s) 137 can classify the surrounding vehicles that sent the initial signal as a connected vehicle.

In some arrangements, the object detection module(s) 137 can be configured to classify detected objects as at least one of people, animals, or vehicles. In some arrangements, the object detection module(s) 137 can be configured to classify some objects as "other" or some other designation when a detected object that is not a person, an animal, or a vehicle. The object detection module(s) 137 can output classification data 118 for the detected objects. As an example, the classification data 118 for a detected object can be one of a person, an animal, a connected vehicle, a non-connected vehicle, and/or 'not a person, animal, or vehicle'. The classification data 118 may be stored in the data store in any suitable format such as text, image, and/or a tabulated format.

The ego vehicle 102 can include one or more horn mode selection modules 138. The horn mode selection module 138 can be configured to select one of the signal-based mode and the sound-based mode for the vehicle horn 150 based on the driving environment data acquired by the one or more sensors. More specifically, the horn mode selection module 138 can be configured to select one of the signal-based mode and the sound-based mode for the vehicle horn 150 based on the classification of objects detected by the sensors in the external environment of the ego vehicle 102.

As an example, the horn mode selection module 138 can access the classification data 118 for the detected objects in the data store 115. The horn mode selection module 138 can determine whether the classification data 118 indicates the presence of a person, an animal, a non-connected vehicle, and/or a connected vehicle.

In the case where the horn mode selection module 138 determines that the classification data 118 indicates at least one person, at least one animal, and/or at least one non-connected vehicle, the horn mode selection module 138 can select the sound-based mode for the vehicle horn 150. In the case where the classification data 118 indicates no persons, no animals, no non-connected vehicle, and at least one connected vehicle, the horn mode selection module 138 can select the signal-based mode for the vehicle horn 150. In the case where the classification data 118 indicates no persons, no animals, and no vehicles (both non-connected and connected), the horn mode selection module 138 can select the sound-based mode for the vehicle horn 150.

The horn mode selection module 138 can be configured to, responsive to receiving a horn command, cause the vehicle horn 150 to output a signal based on the selected mode. The horn mode selection module 138 can select the mode for the vehicle horn 150. Alternatively, the horn mode selection module can send the selected mode to the vehicle horn 150 for implementation by the vehicle horn 150. As mentioned previously, the vehicle horn 150, in the sound-based mode, can output the audible signal using an audible signal-emitting device 160. The vehicle horn 150, in the signal-based mode, can output the electronic signal using the electronic signal-emitting device 155. The electronic signal can be received by one or more connected vehicles. Upon receiving the electronic signal, the connected vehicle(s) can display the electronic signal and/or information relating to the electronic signal such as the location information of the ego vehicle 102. In some arrangements, the connected vehicle(s) can provide an indication in any suitable form to the ego vehicle 102, confirming that the electronic signal has been received.

Now that the various potential systems, devices, elements and/or components of the ego vehicle 102 have been described, an example method will now be described. Various possible steps of such method will now be described. The method described may be applicable to the arrangements described above, but it is understood that the methods can be carried out with other suitable systems and arrangements. Moreover, the method may include other steps that are not shown here, and in fact, the method is not limited to including every step shown. The blocks that are illustrated here as part of the method are not limited to the particular chronological order. Indeed, some of the blocks may be performed in a different order than what is shown and/or at least some of the blocks shown can occur simultaneously.

Figure 2:
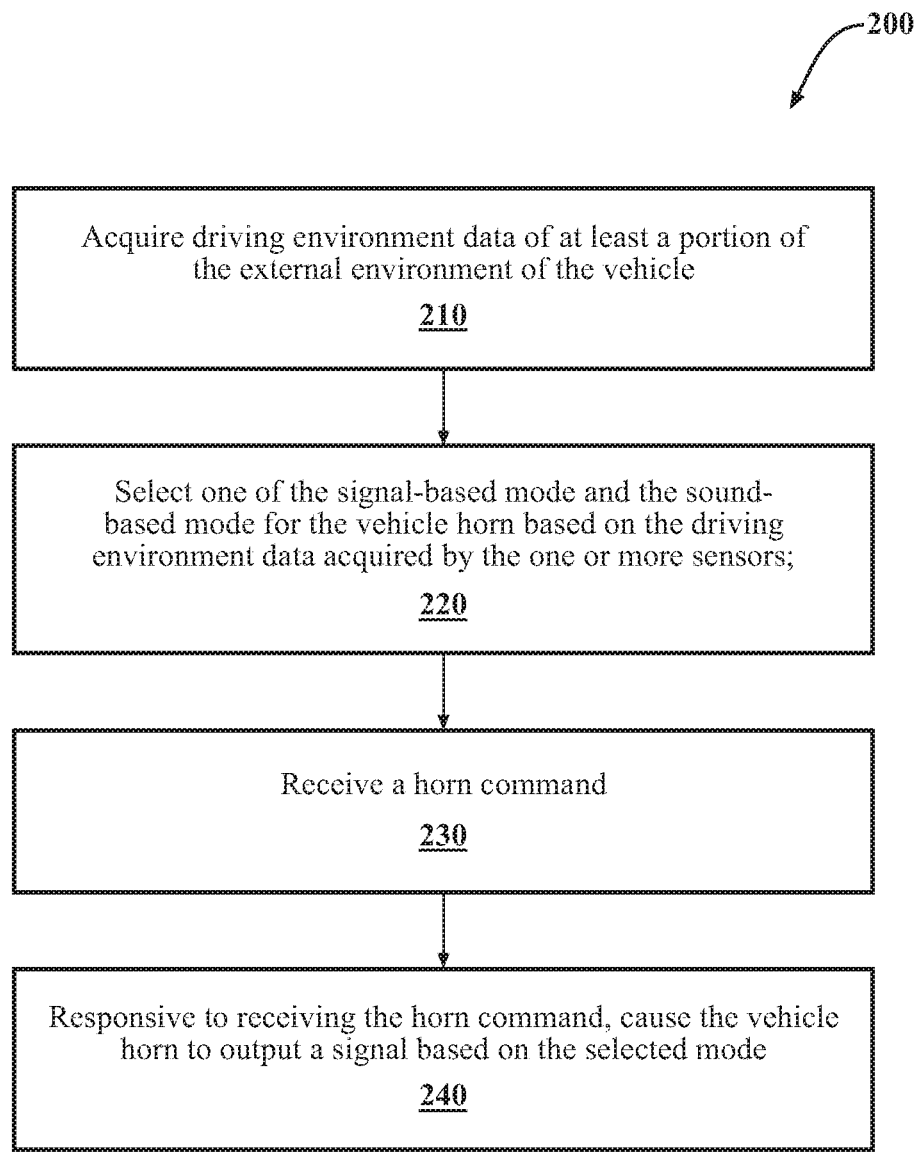
FIG. 2 is an example of a method for selecting a vehicle horn output mode.

Referring now to FIG. 2, an example of a method for selecting a vehicle horn output mode is shown. At block 210, driving environment data of at least a portion of the external environment of the ego vehicle 102 can be acquired. The driving environment data can be acquired using one or more sensors 120 of the ego vehicle 102. For instance, the ego vehicle 102 can use the camera(s) 127 and/or the LIDAR sensor(s) 125 to acquire the driving environment data. The method 200 can continue to block 220.

At block 220, one of the signal-based mode and the sound-based mode for the vehicle horn 150 can be selected based on the driving environment data. The selection of the appropriate mode can be performed by the horn mode selection module(s) 138. The selection process can include analyzing the acquired driving environment data to detect one or more object(s) therein and classifying the detected object(s). The analyzing and/or classifying can be performed by the object detection module(s) 137. In one or more arrangements, objects detected in the driving environment data can be classified as a person, an animal, a non-connected vehicle, or a connected vehicle. Based on the classification of the detected objects surrounding the ego vehicle 102, one of the signal-based mode and the sound-based mode for the vehicle horn 150 can be selected. The method 200 can continue to block 230.

At block 230, a horn command can be received. The horn command may be received as a user input using the input system 130. Alternatively, the horn command may be received as an automated input or control signal from the autonomous driving module(s) 165. The method 200 can continue to block 240.

At block 240, in response to receiving the horn command, the vehicle horn 150 can output a signal based on the selected mode of the vehicle horn. As previously described, in the signal-based mode, the vehicle horn 150, and more specifically, the electronic signal-emitting device 155 can output an electronic signal that is transmitted to connected vehicles in the environment surrounding the ego vehicle 102. In the sound-based mode, the vehicle horn 150, or more specifically, the audible signal-emitting device 160 can output a sound signal audible to humans and animals. The method 200 can end. Alternatively, the method 200 can return to block 210 or some other block.

Figure 3:
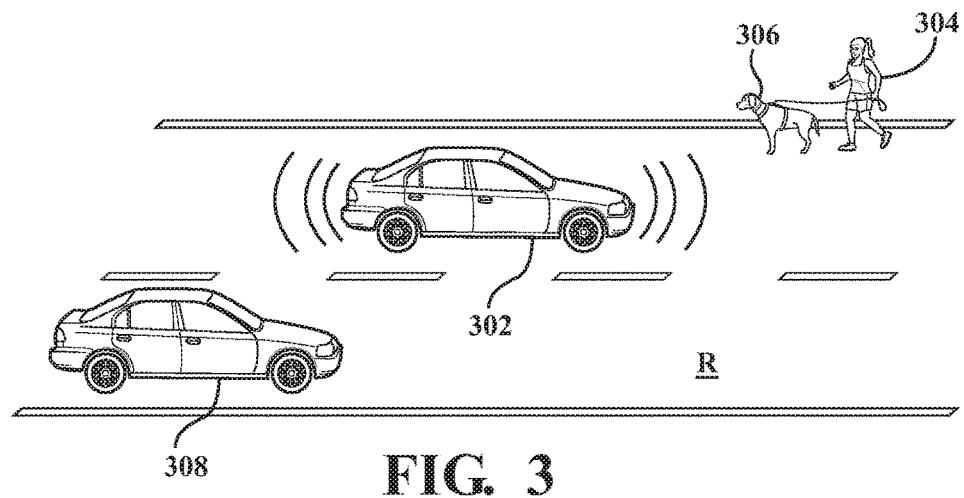
FIG. 3 is an example of a scenario in which a driving environment includes a person, an animal, and a connected vehicle.

A non-limiting example of the operation of an ego vehicle 302, which is similar to the ego vehicle 102, and/or one or more of the methods will now be described in relation to FIG. 3. FIG. 3 shows an example of a scenario in which a driving environment includes a person 304, a dog 306, and a connected vehicle 308. Referring to FIG. 3, the ego vehicle 302 and the connected vehicle 308 can be traveling on a road R, while the person 304 and the dog 306 are walking alongside the road R.

The ego vehicle 302 can use one or more sensors (such as one or more cameras) to acquire driving environment data of at least a portion of the external environment of the ego vehicle 302. In this example, the driving environment data can indicate the presence of the three objects 304, 306, 308. In some embodiments, the sensors may be capable of classifying the three objects 304, 306, 308. Alternatively, the object detection module(s) 137 can analyze the driving environment data and classify the three objects 304, 306, 308 as being a person, an animal, and a connected vehicle, as described above.

The horn selection module 138 can select the sound-based mode for the vehicle horn 150 based on the presence of the person 304 and the dog 306. A driver in the ego vehicle 102 can depress a button in the input system 130, to send a horn command. In response to receiving the horn command, the vehicle horn 150 which has been set to the sound-based mode, can output an audible sound to the external environment surrounding the ego vehicle 302, using the audible signal-emitting device 160.

Figure 4:
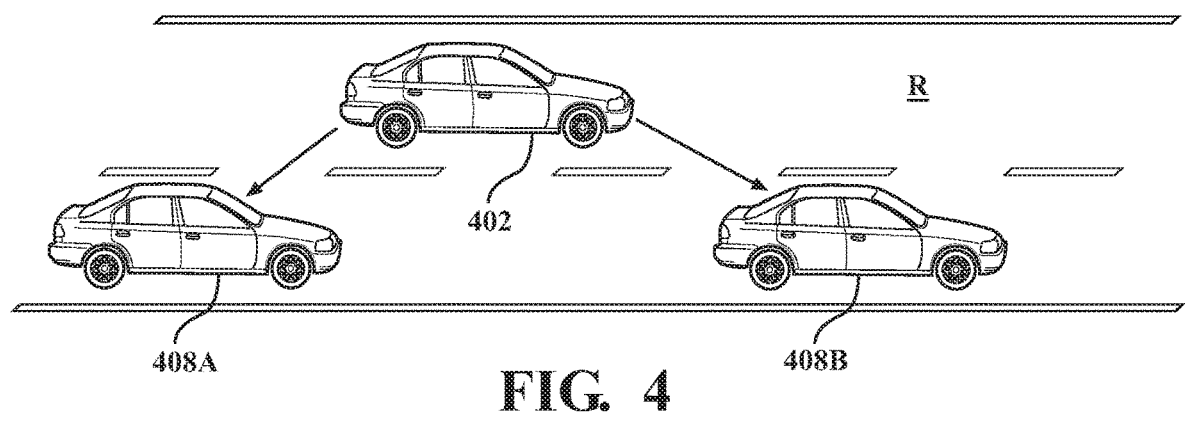
FIG. 4 is an example of a scenario in which the driving environment includes two connected vehicles.

A non-limiting example of the operation of an ego vehicle 402, which is similar to the ego vehicle 102, and/or one or more of the methods will now be described in relation to FIG. 4. FIG. 4 shows an example of a scenario in which the driving environment includes two connected vehicles 408A, 408B. Referring to FIG. 4, the ego vehicle 402 and the connected vehicles 408A, 408B can be traveling on a road R.

The ego vehicle 402 can use one or more sensors (such as cameras) to acquire driving environment data of at least a portion of the external environment of the ego vehicle 402. In this example, the driving environment data can indicate the presence of the two objects 408A, 408B. The object detection module can analyze the driving environment and classify the two objects 408A, 408B as being vehicles. The object detection module 137 can broadcast a signal and determine whether the object detection module 137 receives a response from the vehicles 408A, 408B, indicating that the vehicles 408A, 408B are connected vehicles. In this example, the vehicles 408A, 408B respond to the test signal. Upon receiving the response from the vehicles 408A, 408B, the object detection module 137 can identify the vehicles 408A, 408B as being connected vehicles.

The horn selection module 138 can select the signal-based mode for the vehicle horn 150 based on the presence of connected vehicles 408A, 408B and the absence of persons, animals, and non-connected vehicles. A driver in the ego vehicle 402 can depress a button in the input system 130 to send a horn command. In response to receiving the horn command, the vehicle horn 150 which has been set to the signal-based mode, can output an electronic signal to the connected vehicles, 408A, 408B, using the electronic signal emitting device 155.

Figure 5:
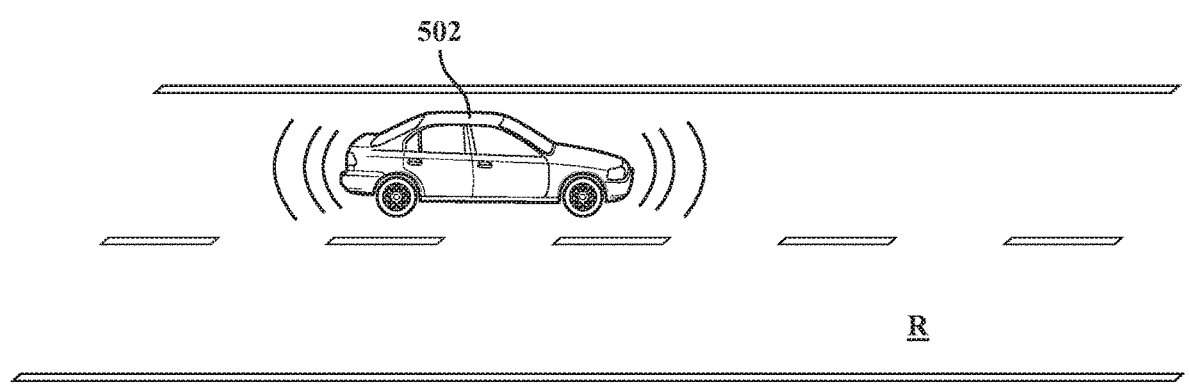
FIG. 5 is an example of a scenario in which there are no persons, animals, or vehicles in the driving environment.

A non-limiting example of the operation of an ego vehicle 502, which is similar to the ego vehicle 102, and/or one or more of the methods will now be described in relation to FIG. 5. FIG. 5 shows an example of a scenario in which there are no persons, animals, and/or vehicles in the driving environment. Referring to FIG. 5, the ego vehicle 502 can be traveling on a road R.

The ego vehicle 102 can use one or more sensors to acquire driving environment data of at least a portion of the external environment of the ego vehicle 502. In this example, the driving environment data can indicate the absence of persons, animals, and (connected or non-connected) vehicles.

The horn selection module 138 can select the sound-based mode for the vehicle horn 150 based on the absence of persons, animals, and/or vehicles. A driver in the ego vehicle 102 can depress a button in the input system 130 to send a horn command. In response to receiving the horn command, the vehicle horn 150 which has been set to the sound-based mode, can output an audible sound to the external environment surrounding the ego vehicle 502, using the audible signal-emitting device 160.

It will be appreciated that arrangements described herein can provide numerous benefits, including one or more of the benefits mentioned herein. For example, arrangements described herein can reduce noise pollution caused by vehicle horns. Arrangements described herein can effectively communicate a driver's intentions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC, or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A system comprising:
    a vehicle horn having a signal-based mode and a sound-based mode, wherein in the signal-based mode, the vehicle horn is configured to output an electronic signal; and wherein in the sound-based mode, the vehicle horn is configured to output an audible signal;
    one or more sensors, the one or more sensors being configured to acquire driving environment data of at least a portion of an external environment of an ego vehicle;
    one or more processors, the one or more processors being operatively connected to the vehicle horn;
    one or more data stores operatively connected to the one or more processors and storing instructions that when executed by the one or more processors cause the one or more processors to:
        analyze the driving environment data acquired by the one or more sensors to detect an object of interest therein, the object of interest being at least one of a person, an animal, and a vehicle;
        when a vehicle is detected, determine whether the vehicle is a connected vehicle or a non-connected vehicle;
        select the sound-based mode when a person, an animal, or a non-connected vehicle is detected;
        select the signal-based mode when the only object of interest detected is one or more connected vehicles, whereby no person, animal, or non-connected vehicle is detected;
        receive a horn command; and
        responsive to receiving the horn command, cause the vehicle horn to output a horn signal based on the selected mode.

2. The system of claim 1, wherein select one of the signal-based mode and the sound-based mode for the vehicle horn based on the driving environment data acquired by the one or more sensors further includes:
    select the sound-based mode when an object of interest is not detected in the driving environment data.

3. The system of claim 1, wherein the horn command is based on a user input.

4. The system of claim 1, wherein the horn command is based on an automated input.

5. The system of claim 1, wherein, when the signal-based mode is selected, the horn signal includes location information of the ego vehicle.

6. The system of claim 1, wherein the one or more sensors include at least one of a camera, a LIDAR sensor, and a radar sensor.

* * * * *